United States Patent [19]

Invie

[11] Patent Number: 5,518,788
[45] Date of Patent: May 21, 1996

[54] ANTISTATIC HARD COAT INCORPORATING A POLYMER COMPRISING PENDANT FLUORINATED GROUPS

[75] Inventor: Judith M. Invie, Woodbury, Minn.

[73] Assignee: Minnesota Mining and Manufacturing Company, St. Paul, Minn.

[21] Appl. No.: 339,383

[22] Filed: Nov. 14, 1994

[51] Int. Cl.$^6$ ............................. B32B 27/00; G11B 7/24
[52] U.S. Cl. ................. 428/65.1; 369/275.1; 369/275.5; 369/284; 369/286
[58] Field of Search ............................. 369/275.1, 275.5, 369/284, 286; 522/109, 127; 525/195, 200, 326.3, 326.4, 343, 366, 378, 383; 428/65.1

[56] References Cited

U.S. PATENT DOCUMENTS

| | | | |
|---|---|---|---|
| 3,341,497 | 9/1967 | Sherman et al. | 260/72 |
| 3,787,351 | 1/1974 | Olson | 260/40 |
| 4,272,615 | 6/1981 | Yoneyama et al. | 430/527 |
| 4,272,616 | 6/1981 | Kishimoto | 430/529 |
| 4,313,978 | 2/1982 | Stevens et al. | 427/384 |
| 4,335,201 | 6/1982 | Miller et al. | 430/527 |
| 4,484,990 | 11/1984 | Bultman et al. | 204/106 |
| 4,505,990 | 3/1985 | Dasgupta | 428/694 |
| 4,582,781 | 4/1986 | Chen et al. | 430/527 |
| 4,584,259 | 4/1986 | Mayer et al. | 430/273 |
| 4,782,477 | 11/1988 | Ichihara et al. | 369/275 |
| 5,098,446 | 3/1992 | Rodriguez et al. | 8/94 |
| 5,176,943 | 1/1993 | Woo | 428/64 |
| 5,268,211 | 12/1993 | Soga et al. | 428/64 |

FOREIGN PATENT DOCUMENTS

| 52-41182 | 9/1975 | Japan . |
| 57-42741 | 8/1980 | Japan . |
| 3-172358 | 12/1989 | Japan . |
| 4-180970 | 11/1990 | Japan . |
| 4-264167 | 2/1991 | Japan . |
| 4-288312 | 3/1991 | Japan . |
| 4-306266 | 4/1991 | Japan . |
| 5-105726 | 10/1991 | Japan . |
| 6-136355 | 10/1992 | Japan . |
| 6-136354 | 10/1992 | Japan . |

OTHER PUBLICATIONS

Fluorochemical Surfactants, Dr. M. T. Pike, *Paint and Varnish Production*, Mar. 1972, pp. 27–32.

*Primary Examiner*—Vasu S. Jagannathan
*Attorney, Agent, or Firm*—Gary L. Griswold; Eric D. Levinson

[57] ABSTRACT

An optical recording disk having an antistatic hard coat layer provided on at least one surface of the disk, wherein the hard coat layer comprises a fluorinated ionic salt; a polymer comprising a plurality of pendant fluorinated groups, and optionally a nonionic fluorinated surfactant. The polymer comprising a plurality of pendant fluorinated groups is preferably a copolymer derived from monomers comprising a nonfluorinated vinyl monomer; and a vinyl monomer comprising a fluorinated group.

21 Claims, 1 Drawing Sheet

ANTISTATIC HARD COAT INCORPORATING A POLYMER COMPRISING PENDANT FLUORINATED GROUPS

FIELD OF THE INVENTION

The present invention relates generally to the use of antistatic hard coat compositions, such as for use on optical media, and more specifically to antistatic hard coat compositions comprising a fluorinated ionic salt and fluorinated monomers and copolymers.

BACKGROUND OF THE INVENTION

Optical recording media typically comprise an optical recording layer provided on a substrate. For media such as magneto optic recording media and WORM (write-once-read-many) optical recording media, the optical recording layer generally contains a thin film rare earth transition metal alloy such as gadolinium-cobalt (Gd-Co), gadolinium-iron (Gd-Fe), terbium-iron (Tb-Fe), dysprosium-iron (Dy-Fe), Gd-Tb-Fe, Tb-Dy-Fe, Tb-Fe-Co, terbium-iron-chromium (Tb-Fe-Cr), gadolinium-iron-bismuth (Gd-Fe-Bi), Gd-Co-Bi, gadolinium-iron-tin (Gd-Fe-Sn), Gd-Fe-Co, Gd-Co-Bi, and Gd-Dy-Fe. Such alloys are described, for example, in U.S. Pat. No. 4,822,675. For media such as compact disks, the optical recording layer may be a layer of reflective material, for example an aluminum or aluminum alloy, having a patterned, information-bearing surface.

Many of the materials which are suitable for the optical recording layer of optical disks react strongly with oxygen and other elements which may be present in the environment in which optical recording media are used. Furthermore, the substrate itself may contain impurities which react with the optical recording layer. Thus, transparent dielectric films may be deposited on one or both sides of the optical recording layer to protect it. Such dielectric films are described, for example, in U.S. Pat. Nos. 4,833,043 and 4,917,970.

Optionally a reflective layer may be incorporated into optical recording media so that incident light that passes through the optical recording layer a first time is reflected and passes back through the optical recording layer a second time. Such reflection increases the magneto optic rotation of incident light because the so-called Faraday effect is added to the so-called Kerr effect.

The reflective layer may be incorporated into a magnetic recording medium such that the optical recording layer is interposed between the substrate and the reflective layer. For such media, transparent substrates are used so that incident light passes first through the substrate, then passes through the optical recording layer, and then is reflected by the reflective layer back through the optical recording layer. Such media are known as substrate incident media. Alternatively, when the optional reflective layer is disposed between the substrate and the optical recording layer, the read and write beams will not be directed through the substrate. Such a medium is known as an air incident medium, although generally there is at least one layer between the optical recording layer and the air.

For substrate incident media, the substrate is typically formed from polycarbonate. Polycarbonate substrates have excellent rigidity, dimensional stability, transparency, and impact strength, but unfortunately have poor abrasion resistance. Consequently, polycarbonate substrates are susceptible to physical damage from scratches, abrading, and the like.

To protect the substrate from physical damage, a "hard coat" layer is coated onto the substrate to form a protective barrier between the substrate and the air. For example, Japanese Kokai No. JP02-260145 describes a hard coat layer that is coated onto the substrate of an optical card. The hard coat layer is formed from an electron-beam or ultraviolet radiation curable resin. The hard coat layer of Japanese Kokai No. JP02-260145 also includes a surface slipping agent, i.e., a lubricant.

Static charge build-up attracts dust to the hard coat layer of optical recording media, which can prevent read and write beams from reaching the optical recording layer during writing or reading. Thus, it is generally desirable to use antistatic agents to reduce this static charge build-up.

Antistatic compositions must satisfy stringent requirements in order to be suitable for use in optical recording media. In addition to providing protection against the build-up of static charge, antistatic compositions must be transparent, abrasion resistant, and compositionally stable so that the compositions remain transparent for long periods of time. If the compositions become hazy, the amount of incident light that reaches the optical recording layer may be reduced, thus causing an increase in bit error rate, an increase in spare sector, or a loss of data. Another requirement concerns the viscosity of the antistatic composition. To obtain an antistatic coating of uniform thickness, the antistatic composition preferably must have low viscosity, e.g., 100 centipoise or less at 25° C. The use of heat curable or hot thermoplastic compositions must also be avoided, since higher temperatures, e.g., temperatures greater than about 100° C., can damage optical recording media and/or adversely affect media performance.

Generally, there are two approaches to using antistatic agents with the hard coat layer. One approach involves coating an antistatic agents directly onto a hard coat layer. This approach, however, generally does not provide long-lasting antistatic protection because coatings applied directly onto a hard coat do not adhere well and tend to be easily wiped away. Another approach involves pre-mixing antistatic agents into a hard coat composition before the hard coat layer is coated onto the media. With this approach, however, the conventional antistatic agents have been used at relatively high concentrations. High concentrations are required in order to provide acceptable antistatic protection, but the resulting hard coat layers tend to become hazy over time, show poor abrasion resistance, and delaminate from the media.

U.S. Pat. No. 5,176,943 (Woo) describes an antistatic hard coat composition comprising a nonionic perfluoro surfactant, an ionic perfluoro surfactant and a nonfluorinated copolymerizable radiation curable prepolymer, as well as optical recording disks comprising this antistatic hard coating.

SUMMARY OF THE INVENTION

Ever-increasing optical disk performance expectations and data storage capacities create a need for heightened quality standards for the construction of optical disks. Increased disk capacities require more information to be compressed in the same amount of space. With so much information compressed onto the disk, the disk becomes extremely sensitive to performance-hindering defects in all aspects of its construction, including the hard coat layer.

Generally, a defect in a hard coat can be any nonuniformity in the coating. The present inventor has observed slight cosmetic imperfections on the surface of some disks coated with conventional antistatic hard coatings. These defects take the form of radial flow lines or "sun rays" generally extending away from the center, and existing on the outer portion of a disk comprising an antistatic hard coating. Not only are these defects cosmetically unacceptable, but they can also cause performance problems during use, e.g., increased focus signal error.

Another form of a hard coat defect is a nonuniform coating thickness throughout the area of the coating. To have an effect on performance, the difference in coating thickness need only be very small, for instance, as small as 0.5 to 1.0 μm. Although not objectionable cosmetically, even such a slight inconsistency is capable of causing performance problems with the new generations of high density disk products. The nonuniformity can be in the form of an "orange peel" surface appearing throughout the coating, or it can be a simple random variation in thickness. A nonuniform coating thickness will cause more problems if the differences occur radially, as opposed to concentrically from the center of the disk, because data is recorded onto and read from the disk as concentric rings. The present invention reduces or eliminates performance defects arising from imperfections in an antistatic hard coat layer.

An aspect of the present invention is an optical recording disk having an antistatic hard coat layer provided on at least one surface of the disk, wherein the hard coat layer comprises a fluorinated ionic salt and a polymer comprising a plurality of pendant fluorinated groups. In a preferred embodiment, the polymer comprising pendant fluorinated groups is a copolymer derived from a nonfluorinated vinyl monomer and a vinyl monomer comprising a fluorinated group.

As used herein, "(meth)acryl-" refers collectively to methacryl- and acryl-.

As used herein, "fluorinated" refers to a molecule wherein one or more of the sites normally occupied by hydrogen atoms are occupied by fluorine atoms. A "perfluoro group" is a fluorocarbon group in which all of the sites normally occupied by hydrogen atoms are occupied by fluorine atoms.

DESCRIPTION OF THE PREFERRED EMBODIMENTS OF THE INVENTION

Figure 1:
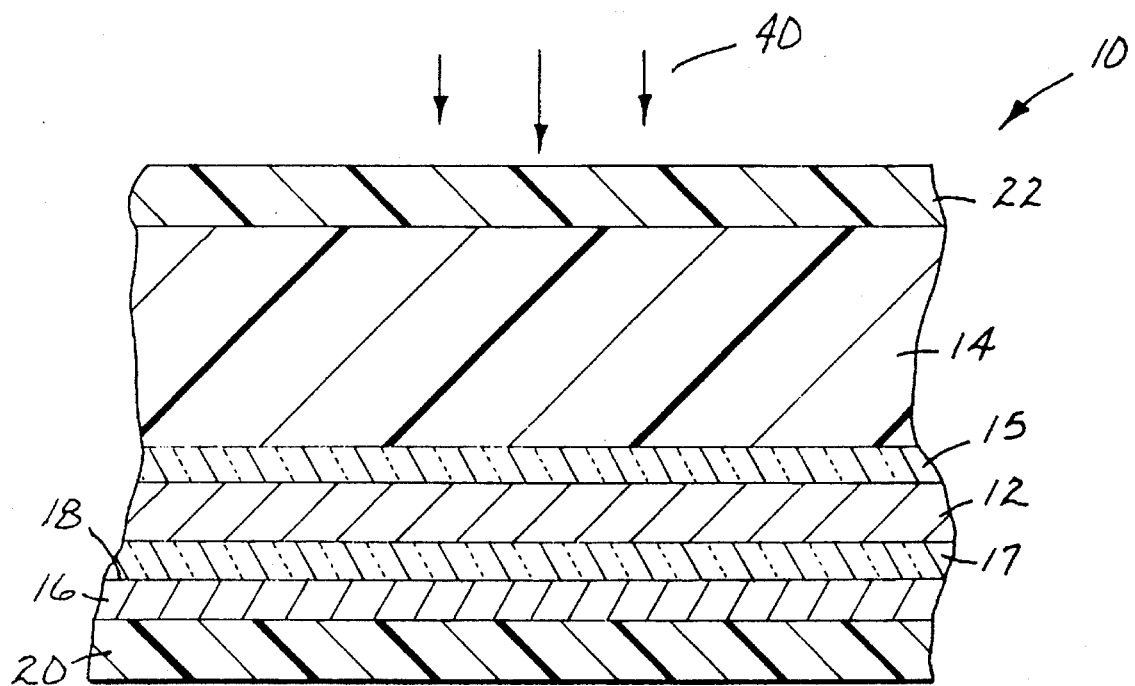
FIG. 1 is a schematic cross-section of a magneto optic recording medium comprising an antistatic coating of the present invention.

FIG. 1 shows a greatly enlarged schematic cross-section through a portion of an illustrative substrate incident magneto optic ("MO") recording disk 10 of the present invention. It is to be understood, however, that the antistatic compositions of the present invention are not limited solely to use on MO media, but rather are suitable for use on a wide variety of materials. For example, in addition to being used with MO disks, the antistatic compositions of the present invention are particularly suitable for use with other kinds of optical recording media such as compact disks, CD-ROM, CD-R, WORM (i.e., write-once-read-many) media, and the like.

Referring now to FIG. 1, an optical recording layer 12 is provided on a transparent substrate 14. A film 16 having a reflective surface 18 is disposed to reflect incident light 40 which will have been transmitted through the magneto optic layer 12 a first time back through the optical recording layer 12 a second time. A protective sealcoat 20 is disposed over the film 16 to protect the optical recording layer 12 from the environment. Optionally, transparent dielectric layers 15 and 17 may be disposed on one or both sides of the optical recording layer 12. As is known in the art, such dielectric layers enhance the optical signal from the optical recording layer 12 and also protect the optical recording layer 12 from oxidation or corrosion due to heat, humidity, or chemical reactions with impurities. A hard coat layer 22 of the present invention is provided over the substrate 14 to protect the substrate 14 from physical damage.

The substrate 14, optical recording layer 12, film 16, protective sealcoat 20, and the dielectric layers 15 and 17 can be of a type known in the art. However, the substrate 14 is preferably formed from polycarbonate because the antistatic compositions of the present invention show excellent adhesion to polycarbonate substrates.

The cured hard coat layer 22 comprises a fluorinated ionic salt and a polymer comprising a plurality of pendant fluorinated groups, which are more preferably perfluorinated groups. The pendant fluorinated groups may be directly attached to the polymer backbone, or they may be pendant to the backbone via a suitable linking group.

Fluorinated ionic salts which reduce static charge buildup and improve the conductivity of a cured antistatic hard coat are preferred, such as those described in U.S. Pat. No. 5,176,943 (Woo). Examples of suitable fluorinated ionic salts include the following:

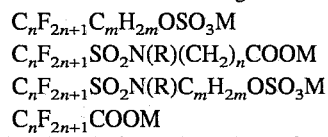

wherein n is from about 1 to 16, M is $Na^+$, $Li^+$, $K^+$, $H^+$, or $NH_4^+$, preferably $Li^+$; m is from about 1 to 10, preferably from about 8–10; and R is hydrogen or lower alkyl of 1–12 carbon atoms such as H, $CH_3$, $CH_3CH_2$, and the like. One class of preferred fluorinated ionic salts can be generally described by formula I

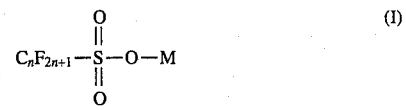

wherein n is preferably from about 8 to 10 and M is $Na^+$, $Li^+$, $K^+$, $H^+$, or $NH_4^+$, preferably $Li^+$.

The polymer comprising a plurality of pendant fluorinated groups can be a copolymer derived from a nonfluorinated vinyl monomer and a vinyl monomer comprising a fluorinated group. As used with respect to a vinyl monomer, the term "vinyl" means that the monomer contains crosslinkable vinyl unsaturated moieties that polymerize upon being exposed to suitable radiation (e.g., ultraviolet radiation or electron beam radiation). Preferably, the nonfluorinated vinyl monomer and the vinyl monomer comprising a fluorinated group may be used with the other components of the present invention to provide an uncured antistatic hard coat admixture that has a viscosity sufficiently low to be spin coated, as described in more detail below.

Examples of suitable vinyl unsaturated moieties include (meth)acryl moieties, alkenyl double bonds such as allyl moieties, α-methyl styrene moieties, vinyl ether moieties, mixtures thereof, and the like. The nonfluorinated vinyl monomer and the vinyl monomer comprising a fluorinated group may comprise only a single vinyl unsaturated moiety, or optionally it may be multifunctional, i.e., di-, tri-, tetra-functional, etc.

For purposes of the present application, "monomer" means a molecule which is capable of copolymerizing with the other monomers of the present invention via the vinyl unsaturated moiety or moieties to produce a polymer or copolymer. The use of relatively higher molecular weight monomers or oligomers is also contemplated to be within the scope of the present inventions, however, higher molecular weight materials tend to increase the viscosity and the surface energy of admixtures comprising such materials. For example, the viscosity of an uncured admixture comprising a fluorinated ionic salt, a nonfluorinated vinyl monomer, and at least one of a monomer comprising a perfluoro group or a copolymer comprising pendant fluorinated groups, is preferably no higher than about 100 centipoise at a temperature of 25 C. If the viscosity of the admixture is too high, the admixture may be unsuitable for use with the spin coating techniques which are most desirably used to apply the uncured composition to a disk prior to curing. Lower molecular weight monomeric materials not only tend to be characterized by lower viscosity, but also generally have lower surface tension, which facilitates coating and improved adhesion to the substrate.

One class of preferred radiation curable nonfluorinated vinyl monomers suitable in the practice of the present invention includes (meth)acrylate functional monomers of the general formula

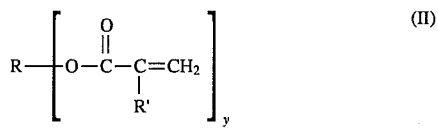

wherein R' is hydrogen or $CH_3$, and y is preferably from about 1 to 6. The precise nature of R is not critical, however R has a valency y. Representative R groups include those that comprise, for example, oxyalkylene groups, urethanes, epoxies, alkyl groups, aryl-containing groups, and allyl-containing groups, etc., any of which can be straight, branched, cyclic, or unsaturated.

More specifically, the nonfluorinated vinyl monomer according to formula II include, but are not limited to, any of the following examples: neopentylglycol di(meth)acrylate, tricyclodecanedimethylol di(meth)acrylate, trimethylolpropane tri(meth)acrylate, pentaerythritol tri(meth)acrylate, dimethylolpropanetetra(meth)acrylate, tetrahydrofurfuryl(meth)acrylate, multifunctional (meth)acrylated polyester, multifunctional (meth)acrylated epoxy novolac, hexafunctional aliphatic urethane (meth)acrylate, aliphatic urethane di(meth)acrylate, 1,6-hexanediol di(meth)acrylate, isobornyl (meth)acrylate, 2-ethoxyethoxy ethyl (meth)acrylate, polyethylene glycol di(meth)acrylate, dipentaerythritol penta(meth)acrylate, tripropylene glycol di(meth)acrylate, dipentaerythritol hydroxy penta(meth)acrylate, fatty acid modified hexafunctional polyester (meth)acrylate, multi-functional aromatic urethane (meth)acrylate, multi-functional aliphatic urethane (meth)acrylates, neopentyl glycol di(meth)acrylate, ethoxylated bisphenol A di(meth)acrylate, tris(2-hydroxyethyl) isocyanurate tri(meth)acrylate, N-vinylformamide, and mixtures thereof. Most preferred nonfluorinated vinyl monomers of this type include: mixtures of pentaerythritol triacrylate and N-vinyl pyrrolidone; and, commercially available nonfluorinated vinyl monomers such as TB3070N, sold by Three Bond Chemical Company of America, Inc., Torrance, Calif.

A further class of preferred nonfluorinated vinyl monomers include those described generally in U.S. Pat. Nos. 3,341,497; 3,787,351; and 5,098,446, e.g., vinyl monomers comprising straight chain or branched oxyalkylene groups. For the materials recited therein, the ratio of fluorinated vinyl monomer to nonfluorinated vinyl monomer, for purposes of the present invention, can be in the range from 1:99 to 99:1; preferably from 1:5 to 5:1; and most preferably is about 3:7.

Examples of suitable vinyl monomers comprising a fluorinated group include monomers preferably represented by formula III:

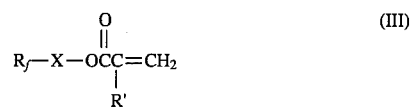

wherein X is a divalent linking group such as an alkyl group, preferably —$CH_2$—, or —$CH_2CH_2$—, or a polyether group, preferably —$(CH_2CH_2O)_n$— wherein n is preferably in the range from 1 to 5; R' is preferably hydrogen or a lower alkyl of 1–12 carbon atoms such as $CH_3$, $CH_3CH_2$, and the like, most preferably H or $CH_3$; and $R_f$ is a fluorinated group, for example a perfluoroether or perfluoropolyether, a fluorochemical sulfonamide, a linear or branched perfluoro group of the formula $C_nF_{2n+1}$, or a cyclic perfluoro group of the formula $C_nF_{2n-1}$.

Where $R_f$ is a straight chain or cyclic perfluoro alkyl of the formula $C_nF_{2n+1}$ or $C_nF_{2n-1}$, n is in the range from about 4 to 16, preferably 7, when the formula is linear or branched and n is preferably 6 when the formula is cyclic. Specific monomers according to formula III wherein Rf is a perfluoroalkyl include

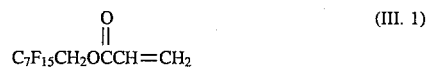

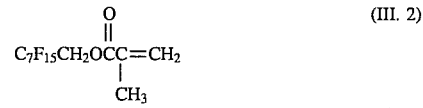

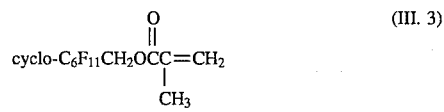

Monomers of formula III in which $R_f$ is a fluorochemical sulfonamide may be represented by formula IV

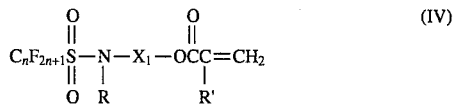

wherein n is preferably from about 4 to 16, most preferably 8; R is preferably hydrogen or a lower alkyl of from 1–12 carbon atoms such as $CH_3$, $CH_3CH_2$ and the like; most preferably $CH_3CH_2$— or $CH_3CH_2CH_2$—. $X_1$ is a divalent linking group such as an alkyl group, preferably —$CH_2$—, or —$CH_2CH_2$—, or a polyether group, preferably —$(CH_2CH_2O)_n$— wherein n is preferably in the range from 1 to 5; and R' are as defined above. Specific monomers according to formula IV include, for example:

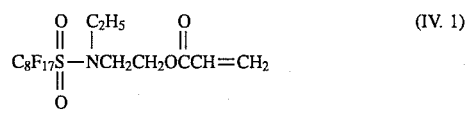

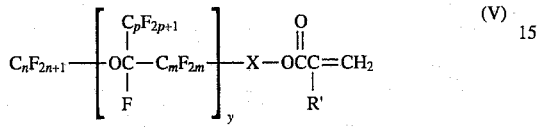

$$\text{(IV. 2)}$$

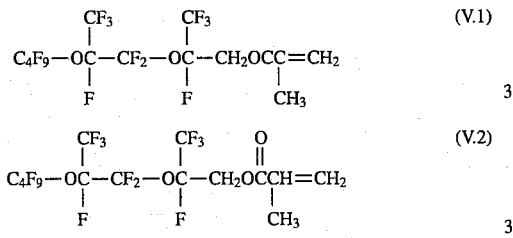

$$\text{(IV. 3)}$$

Where $R_f$ is a perfluoroether or a perfluoro polyether, monomers according to formula III include those having the general formula $$C_nF_{2n+1}\left[\begin{array}{c}C_pF_{2p+1}\\|\\OC-C_mF_{2m}\\|\\F\end{array}\right]_y-X-O\overset{O}{\overset{\|}{C}}C=CH_2 \quad \text{(V)}$$
$$\hspace{12em} R'$$

wherein n is preferably 4; m is from 0 to 4, preferably 1; p is from 1 to 4, preferably 1; y is from 1 to 5, preferably 2, and X and R' are as defined above. In compounds where y is greater than 1, p and m may be the same or different for each of the perfluoroether segments. For example, when y is 2, a compound according to formula V may include both —OCF(CF$_3$)CF$_2$— and —OC(CF$_3$)—

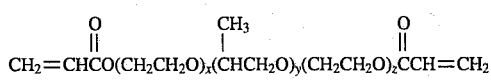

(V.1)

(V.2)

segments. Specific momomers according to formula V include

A particularly preferred copolymer comprising pendant perfluorinated groups is obtained by copolymerizing about 70 parts by weight of a nonfluorinated vinyl monomer having the general formula $$CH_2=CH\overset{O}{\overset{\|}{C}}O(CH_2CH_2O)_x(CH\overset{CH_3}{\overset{|}{C}}H_2O)_y(CH_2CH_2O)_z\overset{O}{\overset{\|}{C}}CH=CH_2$$

wherein x, y, and z, are preferably chosen to provide an average molecular weight in the range from about 500 to 10000, preferably about 2200, x, y, and z, are preferably in the range from about 7 to 17, 16 to 26, and 7 to 17, respectively, and the ratio of (x+z) :y is in the range from about 4:6 to 6:4, with about 30 parts by weight of a vinyl monomer comprising a fluorinated group having the formula

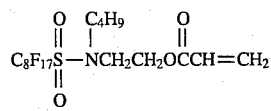

The above copolymer comprising a plurality of pendant fluorinated groups will further comprise a plurality of pendant oxyalkalene groups.

Another particularly preferred copolymer comprising pendant perfluorinated groups further comprises pendant oxyalkylene groups. This copolymer can be obtained by copolymerizing about 70 parts by weight of a nonfluorinated vinyl monomer having the formula

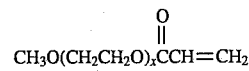

wherein x is preferably in the range from about 12–18, and is chosen to provide an average molecular weight in the range from about 500 to 5000, preferably about 500 to 1000, with about 30 parts by weight of a fluorinated vinyl monomer having the formula

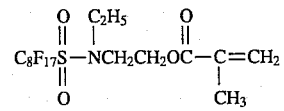

Copolymers comprising pendant fluorinated groups may be prepared by free-radical polymerization methods known in the art. These methods include but are not limited to bulk, solution, emulsion and suspension polymerization methods such as those which have been described in U.S. Pat. No. 3,341,497.

In addition to the ionic salt and the copolymer comprising pendant fluorinated groups, the hard coat composition of the present invention may further comprise other monomeric, oligomeric, or polymeric materials, including one or more additional nonfluorinated vinyl monomers as described above, or nonfluorinated polymers or copolymers derived from one or more of these nonfluorinated vinyl monomers. As an additional option, the antistatic hard coat composition may comprise other classes of fluorinated monomers or surfactants, for instance any of the nonionic flourinated surfactants described in U.S. Pat. No. 5,176,943 (Woo) columns 5–6. Preferred nonionic fluorinated surfactants are those having the general formula

(VI)

wherein n is from about 4 to 16; R' is H or a lower alkyl of from 1 to 12 carbon atoms, and x is from about 1 to 13. A most preferred embodiment of the monomer of formula VI is shown in formula VI.1:

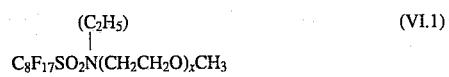

(VI.1)

wherein x is preferably from about 6 to 8, and is most preferably 7.2.

The antistatic hard coat layer of the present invention may contain various amounts of the fluorinated ionic salt, the polymer comprising a plurality of pendant fluorinated groups, the nonfluorinated polymer, if any, and the nonionic perfluoro surfactant, if any. For example, a useful amount of either the polymer comprising pendant fluorinated groups, or the nonfluorinated polymer, or mixtures thereof, is an amount which, in admixture with the other components of the hard coat composition, provides an antistatic hard coat layer having a cosmetic appearance of sufficient quality to allow the substrate to be used as an optical data recording and playback device. A useful amount of fluorinated ionic salt is an amount which will effectively protect against static charge buildup, but will not, either alone or in combination with the other components of the antistatic hard coat, significantly adversely affect the cosmetic appearance of the cured antistatic hard coat layer, or the abrasion resistance, or adhesion characteristics of the cured antistatic hard coat layer. Monomers comprising fluorinated groups, copolymers comprising pendant fluorinated groups, and nonionic fluorinated surfactants can be useful when present in amounts which will lower the surface tension of the uncured antistatic hard coat composition admixture, thereby facilitating the coating of the composition onto a substrate, but will not, either alone or in combination with a fluorinated ionic salt, significantly adversely affect the cosmetic appearance of the cured antistatic hard coat, or the hard coat's abrasion resistance, or ability to adhere to the substrate.

More specifically, in embodiments of the present invention not containing a nonfluorinated polymer, we have found that using from about 0.5 to 8, preferably 1 to 4.5 parts by weight (pbw) of fluorinated ionic salt; about 87 to 99.5 pbw copolymer comprising pendant fluorinated groups; and optionally about 0.1 to 5 pbw of the nonionic perfluoro surfactant is suitable.

In embodiments of the present invention including a nonfluorinated polymer, we have found that using 0.5 to 8 pbw, preferably 1 to 4.5 pbw, of the ionic salt; about 83 to 99.4 pbw of the nonfluorinated polymer; from about 0.1 to 4 pbw, most preferably from about 0.1 to 1.7 pbw, of the copolymer comprising pendant fluorinated groups; and optionally about 0.1 to 5 pbw of the nonionic perfluoro surfactant is suitable. Preferably, in such embodiments the ratio of copolymer comprising a plurality of pendant fluorinated groups, to fluorinated ionic salt, is in the range from about 1:1 to 1:25, preferably from about 1:1 to 1:10, and most preferably from about 1:1 to 1:3

The admixture used to prepare the hard coat layer can contain various amounts of the admixture ingredients as desired. As one example, in embodiments of the present invention in which the cured hard coat layer contains no nonfluorinated polymer, the admixture preferably comprises 0.5 to 8 pbw, preferably 1 to 4.5 pbw, of the ionic salt; about 83 to 99.4 pbw of the nonfluorinated vinyl monomer(s) as described above; from 0.1 to 4 pbw, preferably from about 0.1 to 1.7 pbw, vinyl monomer(s) comprising a fluorinated group; optionally about 0.1 to 5 pbw of the nonionic perfluoro surfactant; and optionally an amount of solvent effective to reduce the viscosity if desired. The weight ratio of vinyl monomer(s) comprising a fluorinated group, to fluorinated ionic salt, is in the range from about 1:1 to 1:25, preferably from about 1:1 to 1:10, and most preferably from about 1:1 to 1:3. However, the total amount of the nonfluorinated vinyl monomer and vinyl monomer comprising a fluorinated group is desirably in the range from about about 88 to 99.4 pbw. In embodiments of the present invention in which the cured hard coat layer contains no nonfluorinated polymer, the fluorinated and nonfluorinated vinyl monomers, upon exposure to a suitable source of radiation, will tend to copolymerize to provide the copolymer comprising a plurality of pendant fluorinated groups of the present invention.

In embodiments of the present invention in which the hard coat layer contains the nonfluorinated polymer, the admixture preferably comprises from about 0.5 to 8 pbw, preferably 1 to 4.5 pbw, of the ionic salt; from about 0.1 to 4 pbw, most preferably from about 0.1 to 1.7 pbw, of the copolymer comprising pendant fluorinated groups; optionally about 0.1 to 5 pbw of the nonionic perfluoro surfactant; 84 to 99.4 pbw of the nonfluorinated vinyl monomer(s) used to make the nonfluorinated polymer as described above; and optionally an amount of solvent effective to reduce the viscosity if desired. The total amount of the copolymer comprising pendant fluorinated groups and the nonfluorinated vinyl monomer(s) used to make the nonfluorinated polymer is desirably in the range from about 84 to 99.4 pbw. Upon exposure to a suitable source of radiation, the nonfluorinated vinyl monomers will tend to copolymerize to provide the nonfluorintaed polymer.

Preferably, the antistatic hard coat compositions of the present invention are prepared from uncured admixtures of appropriate ingredients which are then applied to optical recording media, such as the magneto optic recording disk 10 of FIG. 1, using a spin coating technique, to form an antistatic hard coat layer.

Admixtures of the present invention suitable for spin-coating generally contain ingredients comprising the ionic salt; one or more of the copolymer comprising a plurality of pendant fluorinated groups or vinyl monomers used to make the copolymer comprising a plurality of pendant fluorinated groups; optionally the nonionic perfluoro surfactant; and optionally vinyl monomers used to make the nonfluorinated polymer.

Admixtures of the present invention optionally may further contain a solvent, added as a viscosity controlling agent to facilitate spin coating. The use of a solvent is not required. However, use of a solvent is desirable when either: the uncured components of the admixture are not miscible, i.e., the mixture forms two liquid phases when combined; or when the admixture has a viscosity higher than about 100 centipoise at room temperature. Examples of suitable solvents include methyl alcohol, isopropyl alcohol, N-vinyl-2 pyrrolidone, ethyl acetate, butyl acetate, toluene, butyl alcohol, propylene glycol methyl ether acetate, mixtures of these solvents, and the like. Preferably, the resulting admixture should include a sufficient amount of solvent such that the solution has a viscosity of about 100 centipoise or less, and more preferably from about 3–5 centipoise, at a temperature of about 25 C.

Spin coating allows an extremely uniform coated layer having a thickness of only 0.5 to 20 µm, preferably 0.8 to 10 µm, more preferably 1 to 5 µm, most preferably from 1 to 2 µm, to be easily and quickly formed. To avoid error caused by refraction, it can be desirable that the optical index of the hard coat layer 22 be approximately equal to the optical index of the transparent substrate 14. However, an advantage of providing thin antistatic coatings is that it becomes less important to match these optical indexes, because light passing through a thin coating will experience less refraction.

According to the spin coating technique, an admixture of uncured components of the hard coat layer is prepared. The admixture is delivered onto the substrate 14 of the magneto optic disk 10 using a conventional spin coating apparatus. Such an apparatus generally includes a dispensing needle, a syringe, and a pump. Dispensing the hard coat admixture onto the disk may involve either manually or automatically dispensing the fluid by means of a syringe and a needle. Preferably, the disk to be coated is pre-cleaned with ionized $N_2$ prior to spin-coating. For admixtures having a viscosity of 5 centipoise or less, a needle pressure of 5 to 20 psi (25 to 103 cm Hg) delivers a suitable amount of the admixture onto the center of a disk in about 2 seconds when the disk is spinning at 30 to 50 rpm. Preferably, an in-line filter (0.1 to 2 µm) is used to remove particles from the admixture before the admixture is allowed to pass through the dispensing needle. After delivery, a high spinoff speed of 1800 to 3500 rpm for 3 to 5 seconds disperses the solution into a thin, uniform coating. Most of the solvent evaporates during high speed spin-off.

The wet coating is then cured with a suitable form of radiation. Preferably, curing occurs in a chamber fitted with an exhaust fan. Typically, the exhaust fan is operated during curing in order to remove low boiling, volatile components from the oven.

The uncured antistatic hard coat composition of the present invention may be cured using any suitable form of radiation such as electron beam radiation or ultraviolet radiation. It is preferred that the composition be photocurable, i.e., curable with ultraviolet radiation. Various sources of UV radiation are suitable, including electric powered arc lamps, such as medium pressure or high pressure mercury lamps; and electrodeless lamps; such as H-type, D-type, or V-type metal halide lamps. The specific radiation source should be selected to correspond with the absorption spectra of any photoinitiator. As an example, a UV radiation source operating at wavelengths of between 240 to 450 nm and an energy of 200 to 450 mj/cm$^2$ for 4 to 6 seconds would be preferable in the practice of the present invention.

Preferably, spin coating and/or curing occurs in an inert atmosphere. For example, an atmosphere comprising 90% or more nitrogen may be used.

The invention will now be described by the following non-limiting example.

EXAMPLE 1

Cured hard coat formulations were produced by curing hard coat admixtures comprising ingredients in according to Table 1.

TABLE 1

| Sample | Monomer/ copolymer/ surfactant comprising fluorinated group(s) | Fluorinated Ionic salt (% solids) in IPA | Nonfluorinated vinyl monomer | Monomer/ copolymer/ surfactant comprising fluorinated groups(s) parts by wt. solids | Fluorinated Ionic Salt | Ratio of [fluorinated monomer/ copolymer/ surfactant]: Ionic | Surface Resistivity, Ohms/Sq unit 55–56% RH, 76 F.(25 C.) | Surface Resistivity, Ohms/Sq unit 44–47% R.H. 77 F.(25 C.) |
|---|---|---|---|---|---|---|---|---|
| 1 | C | None | 99.42 | 0.58 | 0 | 1:0 | N/A | > × 10$^{13}$ |
| 2 | D | None | 98.84 | 1.16 | 0 | 1:0 | N/A | > × 10$^{13}$ |
| 3 | D | A | 92 | 3.9 | 4.1 | 1:1 | 2 × 10$^{11}$ | 1.40 × 10$^{12}$ |
| 4 | D | A | 94.7 | 1.17 | 4.12 | 1:3.5 | N/A | 4.00 × 10$^{11}$ |
| 5 | D | A† | 94.66 | 1.17 | 4.17 | 1:3.56 | 2.00 × 10$^{11}$ | N/A |
| 6 | C | A† | 95.22 | 0.59 | 4.19 | 1:7 | 9 × 10$^{10}$ | N/A |
| 7 | C | A | 95.68 | 0.17 | 4.15 | 1:24.4 | 8 × 10$^{10}$ | 4.00 × 10$^{11}$ |
| 8 | C | A | 94.2 | 1.67 | 4.12 | 1:2.5 | 4.3 × 10$^{10}$ | 2.00 × 10$^{11}$ |
| 9 | C | A | 87.59 | 4.17 | 8.24 | 1:2 | 9.00 × 10$^9$ | 6.00 × 10$^{10}$ |
| 10 | C | A | 80.13 | 6.68 | 13.9 | 1:2 | 4.00 × 10$^9$ | 2.00 × 10$^{10}$ |
| 11 | C | A | 95.27 | 0.59 | 4.14 | 1:7 | N/A | 3.00 × 10$^{11}$ |
| 12 | D + C | None | 98.64 | 1.15(D) + 0.2(C) | 0 | 1:0 | N/A | > × 10$^{13}$ |
| 13 | D + C | A(16.3%) | 95.85 | 1.18(D) + 0.2(C) | 2.75 | 1:2 | 4.5 × 10$^{11}$ | 3.00 × 10$^{11}$ |
| 14 | D + C | A(18.8%) | 95.46 | 1.18(D) + 0.2(C) | 3.16 | 1:2.3 | 2.5 × 10$^{10}$ | 1.80 × 10$^{11}$ |
| 15 | E | A | 95.2 | 0.66 | 4.13 | 1:6.26 | 1.2 × 10$^{11}$ | 6.00 × 10$^{11}$ |
| 16 | F | A | 95.4 | 0.47 | 4.14 | 1:8.8 | 2.8 × 10$^{11}$ | 2.00 × 10$^{12}$ |
| 17 | F | A | 92.6 | 3.3 | 4.1 | 1:1.24 | 4 × 10$^{11}$ | 2.80 × 10$^{12}$ |
| 18 | G | A | 94.74 | 1.13 | 4.12 | 1:3.6 | 2.8 × 10$^{11}$ | 1.50 × 10$^{12}$ |
| 19 | G | A | 92.6 | 3.3 | 4.1 | 1:1.24 | 3.5 × 10$^{11}$ | 3.00 × 10$^{12}$ |
| 20 | H | A | 94.87 | 1 | 4.12 | 1:4.1 | 2.6 × 10$^{11}$ | 1.5 × 10$^{12}$ |
| 21 | H | A | 92.6 | 3.3 | 4.1 | 1:1.24 | 2.6 × 10$^{11}$ | 2.00 × 10$^{12}$ |
| 22 | I | A | 95.2 | 0.67 | 4.13 | 1:6.2 | 3.4 × 10$^{11}$ | 1.40 × 10$^{12}$ |
| 23 | I | A | 92.6 | 3.3 | 4.1 | 1:1.24 | 1.8 × 10$^{12}$ | 2.00 × 10$^{12}$ |
| 24 | None | A | 95.85 | 0 | 4.15 | 0:4.17 | 1.8 × 10$^{11}$ | 2.00 × 10$^{12}$ |
| 25 | None | A(16.3%) | 97.22 | 0 | 2.78 | 0:2.8 | N/A | 2.70 × 10$^{12}$ |
| 26 | None | None | 100 | 0 | 0 | 0:0 | >10$^{13}$ | >10$^{13}$ |
| 27 | None | None | 0 | 0 | 0 | 0:0 | >10$^{13}$ | >10$^{13}$ |
| 28 | D | B | 94.52 | 2.76 | 2.72 | 1:1 | 5.3 × 10$^{11}$ | N/A |
| 29 | D | B‡ | 94.66 | 1.17 | 4.17 | 1:3.56 | 2.50 × 10$^{11}$ | N/A |
| 30 | C | B‡ | 95.22 | 0.59 | 4.19 | 1:7 | 7.00 × 10$^{10}$ | N/A |
| 31 | D | B(13.6%) | 94.43 | 1.22 | 4.35 | 1:3.6 | N/A | 5.00 × 10$^{10}$ |
| 32 | C | B(13.6%) | 95 | 0.61 | 4.38 | 1:7.2 | N/A | 9.00 × 10$^{10}$ |

| Sample | Residual Charge* Volts | 10% Charge decay*, seconds | Cosmetic Appearance | Surface Energy Dyne/cm | Focus Error, millivolts | Dust Attraction* |
|---|---|---|---|---|---|---|
| 1 | 400 | infinity | Good | <28 | 20 | Y |
| 2 | 250 | infinity | Fair | <28 | 60–80 | Y |
| 3 | 25 | 0.26 | Good | >70 | 20–30 | N |
| 4 | 0 | 0.08 | Fair–Acceptable | >70 | 30–40 | N |
| 5 | 0 | 0.05 | Fair–Acceptable | >70 | 40–60 | N |
| 6 | 0 | 0.08 | Good | >70 | 20 | N |
| 7 | 0 | 0.16 | Good | >70 | 30–40 | N |
| 8 | 0 | 0.06 | Good | >70 | 20–30 | N |
| 9 | 0 | 0.04 | Poor, Hazy, oily | >70 | N/A | N |
| 10 | 0 | 0.01 | Poor, hazy, oily | >70 | N/A | N |
| 11 | 0 | 0.09 | Good | >70 | 20 | N |
| 12 | 250 | infinity | Good | <28 | 20 | Y |
| 13 | 0** | 0.01 | Good | >70 | 20–40 | N |
| 14 | 25** | 0 | Good | >70 | 20–30 | N |
| 15 | 0 | 0.19 | Good | >70 | 20–30 | N |
| 16 | 25 | 0.33 | Good | >70 | 20–30 | N |
| 17 | 0 | 0.67 | Good | 35 | 30–40 | N |
| 18 | −25 | 0.29 | Good | 41 | 20–30 | N |

TABLE 1-continued

| | | | | | | | |
|---|---|---|---|---|---|---|---|
| 19 | 0 | 0.74 | Good | 41 | 20–30 | N | |
| 20 | 0 | 0.32 | Good | 35 | 20–30 | N | |
| 21 | 0 | 0.59 | Good | 32–35 | 20–30 | N | |
| 22 | 25 | 0.30 | Good | 35 | 20–30 | N | |
| 23 | 25 | 0.35 | Good | 32–35 | 20 | N | |
| 24 | 25 | 0.29 | Fair | 32–35 | 30–40 | N | |
| 25 | 0 | 0.17 | Fair, orange peel | ~28 or less | 30–40 | N | |
| 26 | 1600 | infinity | Good | <28 | 30–60 | Y | |
| 27 | 250 | infinity | Good | 41–44 | 20 | Y | |
| 28 | 230 | 0.93–1.23 | Fair | | 50–100 | N | |
| 29 | 0 | 0.05 | Fair, orange peel | >70 | 60–80 | N | |
| 30 | 0 | 0.07 | Good | >70 | 20–30 | N | |
| 31 | 0 | 0.03 | Fair, Streaks | >70 | 80–100 | N | |
| 32 | 25 | 0.01 | Good | >70 | 20 | N | |

*Tests performed on polycarbonate disk having no MO layer
**These values were collected at 61% R.H., and 25 C
†pH = 1.7
‡pH = 5.1–5.6

All admixtures comprised the nonfluorinated vinyl monomer TB3070N, which is a solution of 30% solids, commercially available from Three Bond Chemical Company of America, Inc. In addition to the nonfluorinated vinyl monomer, TB3070N comprises a 1-hydroxycyclohexyl phenyl ketone photoinitiator having the formula

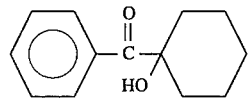

The admixtures of samples 3–11, and 13–25 comprised the fluorinated ionic salt $C_8F_{17}SO_3^-Li^+$ (designated ionic salt A). The admixtures of samples 28–32 comprised the fluorinated ionic salt $C_{10}F_{21}SO_3^-Li^+$ (designated ionic salt B) The fluorinated ionic salts were used at a concentration of 24.7% solids in isopropyl alcohol unless otherwise designated in parenthesis. The pH of the fluorinated ionic salt solution was approximately 7.3 unless otherwise indicated.

The admixtures of samples 2–5, 28, 29, and 31 comprised a nonionic fluorinated surfactant; samples 15–23 comprised a monomer comprising a fluorinated group; samples 1, 6–11, 30, 32 comprised a copolymer comprising pendant fluorinated groups; and samples 12–14 comprised both a nonionic fluorinated surfactant and a copolymer comprising pendant fluorinated groups. The monomers comprising a fluorinated group and the nonionic fluorinated surfactant were used without a solvent, and the copolymers comprising pendant fluorinated groups were used with a solvent as indicated below.

Samples 1, 2, 12, and 24–27 were control samples. The admixtures of these samples did not include one or more of a monomer comprising a fluorinated group, a copolymer comprising pendant fluorinated groups, a nonionic fluorinated surfactant, or a fluorinated ionic salt.

The specific monomers comprising a fluorinated group, nonionic fluorinated surfactants, and copolymers comprising pendant fluorinated groups included in each admixture were as follows.

The copolymer comprising pendant fluorinated groups, designated C, was the copolymer derived from about 30% by weight of the fluorinated monomer

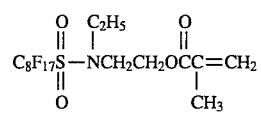

reacted in ethyl acetate with about 70% by weight of Carbowax 750 acrylate,

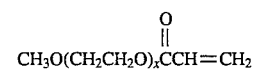

available from Union Carbide, having an average molecular weight of about 750. The copolymer can be produced by adding 3 grams of the fluorinated monomer to 7 grams of Carbowax 750, 5 grams ethyl acetate, 0.15 grams n-octyl mercaptan and 0.1 grams of VAZO™ 64 (2,2' azobisisobutyronitrile, commercially available from DuPont). The mixture is purged with nitrogen to remove oxygen and is reacted at 75 C. for 8–10 hours. In the present application, the copolymer was used at 50% solids in a solvent of ethyl acetate.

The copolymer comprising pendant fluorinated groups, designated E, was the copolymer derived from reacting about 30% by weight of the fluorinated monomer

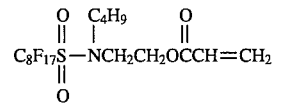

with about 70% by weight pluronic L 44 acrylate,

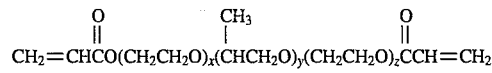

wherein x=12, y=21, and z=12. The pluronic L 44 acrylate is prepared by reacting pluronic L 44 diol, having an average molecular weight of about 2200, and commercially available from BASF, with one equivalent of acrylic acid. The copolymer can be produced by adding 3 grams of the above fluorinated monomer to 7 grams of the pluronic L 44 acrylate, 5 grams of toluene, 0.5 grams of n-octylmercaptan and 0.1 grams of VAZO™ 64. The mixture is purged with nitrogen to remove oxygen, and reacted at 65 C. for 8–10 hours. In the present applications, the copolymer was used at 98% solids in toluene.

The nonionic fluorinated surfactant, designated D, had the formula

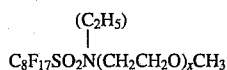

wherein x is from 6 to 8.

The monomer comprising a fluorinated group, designated F, had the formula

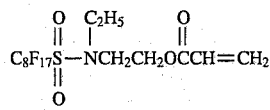

The monomer comprising a fluorinated group, designated G, had the formula

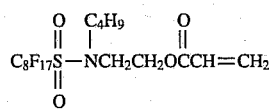

The monomer comprising a fluorinated group, designated H, had the formula

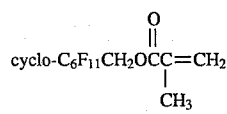

The monomer comprising a fluorinated group, designated I, had the formula

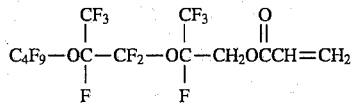

The procedure for preparing the uncured hard coat admixture was generally as follows. The fluorinated ionic salt solution was mixed with any of the monomer comprising a fluorinated group, the copolymer comprising pendant fluorinated groups, or the nonionic fluorinated surfactant, as were present in the formulation. This first admixture was added to the nonfluorinated vinyl monomer. The resulting admixture was agitated for 10–20 minutes by a shaker table. Shaker tables are commercially available from, for example, Eberbach Corp. of Ann Arbor Mich. In order to allow any foam or entrapped air to be released, the samples were allowed to rest for at least 30 minutes at room temperature before being applied to an optical disk.

Samples 3–11, 15–23, and 28–32, were prepared by the above procedure.

Where only a fluorinated ionic salt and a nonfluorinated vinyl monomer were included in an admixture, as in samples 24 and 25, the ionic salt solution was added directly to the nonfluorinated vinyl monomer and the admixture was then agitated.

Where only a copolymer comprising pendant fluorinated groups or a nonionic fluorinated surfactant, and a nonfluorinated vinyl monomer, were included in an admixture, such as in samples 1 and 2, the copolymer comprising pendant fluorinated groups or the nonionic fluorinated surfactant was added directly to the nonfluorinated vinyl monomer and the admixture was then agitated.

In preparing sample 12, materials C and D were first admixed to uniformity, and then added to the nonfluorinated vinyl monomer and admixed.

Samples 13–14 were prepared as follows. The nonionic fluorinated surfactant (D) was first added to the ionic salt solution (A). This admixture was stirred until a homogeneous material was obtained. Next, the copolymer comprising pendant fluorinated groups (C) was added to the above admixture, and the resulting admixture was stirred to uniformity. Afterwards, the admixture containing A, D, and C, was added to the nonfluorinated vinyl monomer, followed by agitation for 10–20 minutes by a shaker table.

Sample 26 is a control sample wherein a polycarbonate disk was coated with 100 percent of the nonfluorinated vinyl monomer. Sample 27 is also a control sample. The disk of sample 27 is uncoated; i.e. the transparent polycarbonate layer 14 of FIG. 1.

The antistatic hard coat compositions were applied to optical disk-shaped polycarbonate substrates by a spin coating technique. Some substrates comprised a magneto optic (MO) layer and some did not, depending upon which test was to be performed on the sample. The residual charge, charge decay, and dust attraction tests were performed on disks that did not comprise a MO layer. All other tests were conducted on disks comprising MO layers.

Each uncured hard coat admixture was manually dispensed onto the polycarbonate surface using a disposable syringe outfitted with a 0.2 μm Teflon™ Acrodisc filter and a needle. The disk was rotated for 2–3 seconds on a turntable at 30–50 RPM (revolutions per minute), followed by a faster spinning cycle at 2200 RPM for 6–7 seconds.

The applied coatings were subsequently cured to a "tack-free" surface by an ultraviolet radiation source. Curing took place under a nitrogen atmosphere.

After coating and curing the antistatic hard coat layers, the surfaces of the hard coat layers were examined for cosmetic defects such as streaks, haze, orange peel, oily residue on the surface by visual and microscope inspections. To evaluate the antistatic performance of the cured hard coat layers their surface resistivities were measured at 44–47% and 55–56% relative humidity and 76–77 F. (25 C.); the residual charge, 10% charge decay of 5000 volts, and the ability of the coating to repel dust were all measured at 76–77 F. (25 C.) and 44–47% relative humidity. All results are given in table 1.

The surface resistivity was measured with an Electrode Model 803B and recorded with a Galvonometer Model 872 from Electro Tech Systems, Inc., of Glenside Pa. Residual charge and 10% charge decay were measured with a Model 406D Static Decay Meter also from Electro Tech Systems, Inc.

Dust attraction was measured a follows. A static charge was induced on the disk of each sample by vigorously rubbing the disk surface with a dry piece of polyester cloth. The disk was then placed in contact with styrofoam beads to see if the styrofoam was attracted to the surface.

"Focus error" means the difference (measured in millivolts) between the position of the beam waist (focal point) of an optical beam, and the correct focal distance to the magneto optical layer of an optical recording disk, as seen by the focus servo of an optical disk test system. Focus error can be measured by equipment which is commercially available from, for example, Pulstec Ltd. of Hammamatsu Japan. The apparatus used in testing the present examples employed a 690 nm laser diode which is focused using a 0.55 numerical aperture objective lens.

The correct distance from the objective lens and the beam waist of an optical beam will be different for disks with and without a chemical hard coat layer because the hard coat materials do not have the same index of refraction as air.

When a hard coat layer is of a substantially uniform thickness, the focusing system of the disk player can easily adjust for the presence of the hard coat layer. However, if the coating is not of a sufficiently uniform thickness, or it contains surface imperfections such as orange peel, "sun rays," etc., the focusing system will attempt to continually compensate by moving the focal point. The focusing system will only be able to compensate for very gradual variations in coating thickness. If the surface imperfection is too great, the hard coat layer will cause the optical disk to be unusable.

Focus error data is not available for samples 9 and 10 because the surface was too oily and hazy.

Table 1 shows that samples which comprise fluorinated ionic salts have good antistatic properties, i.e. very low residual charges and good conductivity (low resistivity) and very short decay times. These samples also are shown to have repelled styrofoam particles in the dust attraction test. Samples 1, 2, 12, 26, 27, wherein the hard coat composition did not contain a fluorinated ionic salt, attracted the styrofoam particles. Samples 1, 2, 12, 26, and 27 had a decay time of "infinity", meaning the decay time exceeded the 5 minute limits of the instrument and a surface resistivity of greater than $1 \times 10^{13}$ Ohms/sq. unit.

Not all hard coat compositions that exhibited superior antistatic properties were cosmetically acceptable. Where the cosmetic appearance was unacceptable, examples of observed defects included haze, oily surface, orange peel and streaks. The data further indicates that such cosmetic defects can lead to increased focus error.

Many of the antistatic hard coat compositions, (samples 6–8, 11, 13–23, 30, and 32) exhibited both antistatic characteristics, and good cosmetic appearance. These samples further showed reduced focus error, making them functional as optical recording devices.

Samples 13 and 14 indicate that the copolymer comprising pendant fluorinated groups C, may be used in combination with nonionic fluorinated surfactant D, to achieve superior antistatic and cosmetic hard coat layers.

Samples 6–8, 11 show the cosmetic appearance is good and the focus error is the lowest (less than 60) when the copolymer comprising pendant fluorinated groups is present at a level less than 4 pbw based on 100 parts total solids, whereas samples 9 and 10, having the copolymer comprising pendant fluorinated groups present at greater than 4 pbw showed unsuitable cosmetic appearance.

What is claimed is:

1. An optical recording disk having an antistatic hard coat layer provided on at least one surface of the disk, wherein the hard coat layer comprises a) a fluorinated ionic salt;

b) a vinyl copolymer comprising a plurality of pendant fluorinated groups; and a nonfluorinated polymer.

2. The optical recording disk of claim 1, wherein the fluorinated ionic salt has the formula

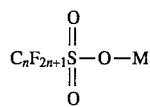

wherein n is from 1 to 16 and M is chosen from the group consisting of: $Na^+$, $Li^+$, $K^+$, $H^+$, and $NH_4^+$.

3. The optical recording disk of claim 2, wherein M is $Li^+$ and n is from about 8 to 10.

4. The optical recording disk of claim 1, wherein the polymer comprising a plurality of pendant fluorinated groups is a copolymer derived from monomers comprising:

a) a nonfluorinated vinyl monomer; and b) a vinyl monomer comprising a fluorinated group.

5. The optical recording disk of claim 4, wherein the nonfluorinated vinyl monomer is a (meth)acrylate functional monomer.

6. The optical recording disk of claim 5, wherein the (meth)acrylate functional monomer has the formula

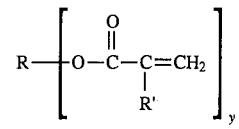

wherein y is from about 1 to 6; R' is H or $CH_3$; and R has a valency y, and comprises species chosen from the group consisting of: urethanes, oxyalkylene groups, alkyl groups, and allyl-containing groups.

7. The optical recording disk of claim 4, wherein the nonfluorinated vinyl monomer comprises an oxyalkylene group.

8. The optical recording disk of claim 7, wherein the nonfluorinated vinyl monomer has the formula

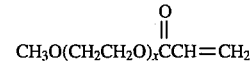

wherein x is chosen such that the average molecular weight of the nonfluorinated vinyl monomer is in the range from 500 to 5000.

9. The optical recording disk of claim 8, wherein the average molecular weight of the nonfluorinated vinyl monomer is in the range from 500 to 1000.

10. The optical recording disk of claim 8, wherein the average molecular weight of the nonfluorinated vinyl monomer is about 750.

11. The optical recording disk of claim 7, wherein the nonfluorinated vinyl monomer is

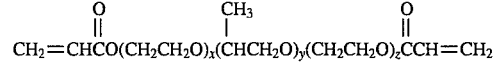

wherein x, y, and z are chosen such that the average molecular weight of the nonfluorinated vinyl monomer is in the range from 500 to 10000, and x is in the range from 7 to 17, y is in the range from 16 to 26, and z is in the range from 7 to 17.

12. The optical recording disk of claim 11, wherein the average molecular weight of the nonfluorinated vinyl monomer is about 2200.

13. The optical recording disk of claim 11, wherein x=12, y=21, and z=12.

14. The optical recording disk of claim 1, wherein the polymer comprising a plurality of pendant fluorinated groups further comprises a plurality of pendant oxyalkylene groups.

15. The optical recording disk of claim 4, wherein the vinyl monomer comprising a fluorinated group is a (meth)acrylate of the formula

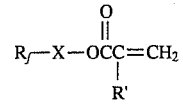

wherein X is a divalent linking group, R' is H or $CH_3$, and $R_f$ is a fluorinated group.

16. The optical recording disk of claim 15, wherein $R_f$ is a perfluoro group having the general formula $-C_nF_{2n+1}$, wherein n is in the range from 4 to 16.

17. The optical recording disk of claim 15, wherein the vinyl monomer comprising a fluorinated group has the formula:

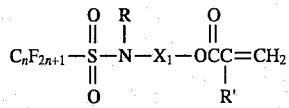

wherein n is from 4 to 16, $X_1$ is a divalent linking group, R is hydrogen or a lower alkyl of 1–12 carbon atoms and R' is H or $-CH_3$.

18. The optical recording disk of claim 17, wherein n is 8 and R is chosen from the group consisting of $CH_3CH_2-$ and $CH_3CH_2CH_2CH_2-$.

19. The optical recording disk of claim 1, wherein the hard coat layer further comprises a nonionic fluorinated surfactant.

20. The optical recording disk of claim 19, wherein the nonionic fluorinated surfactant has the formula

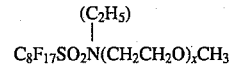

wherein x is 7.2.

21. The optical recording disk of claim 1, wherein the nonfluorinated polymer is a copolymer of one or more nonfluorinated vinyl monomers.

* * * * *